UNITED STATES PATENT OFFICE.

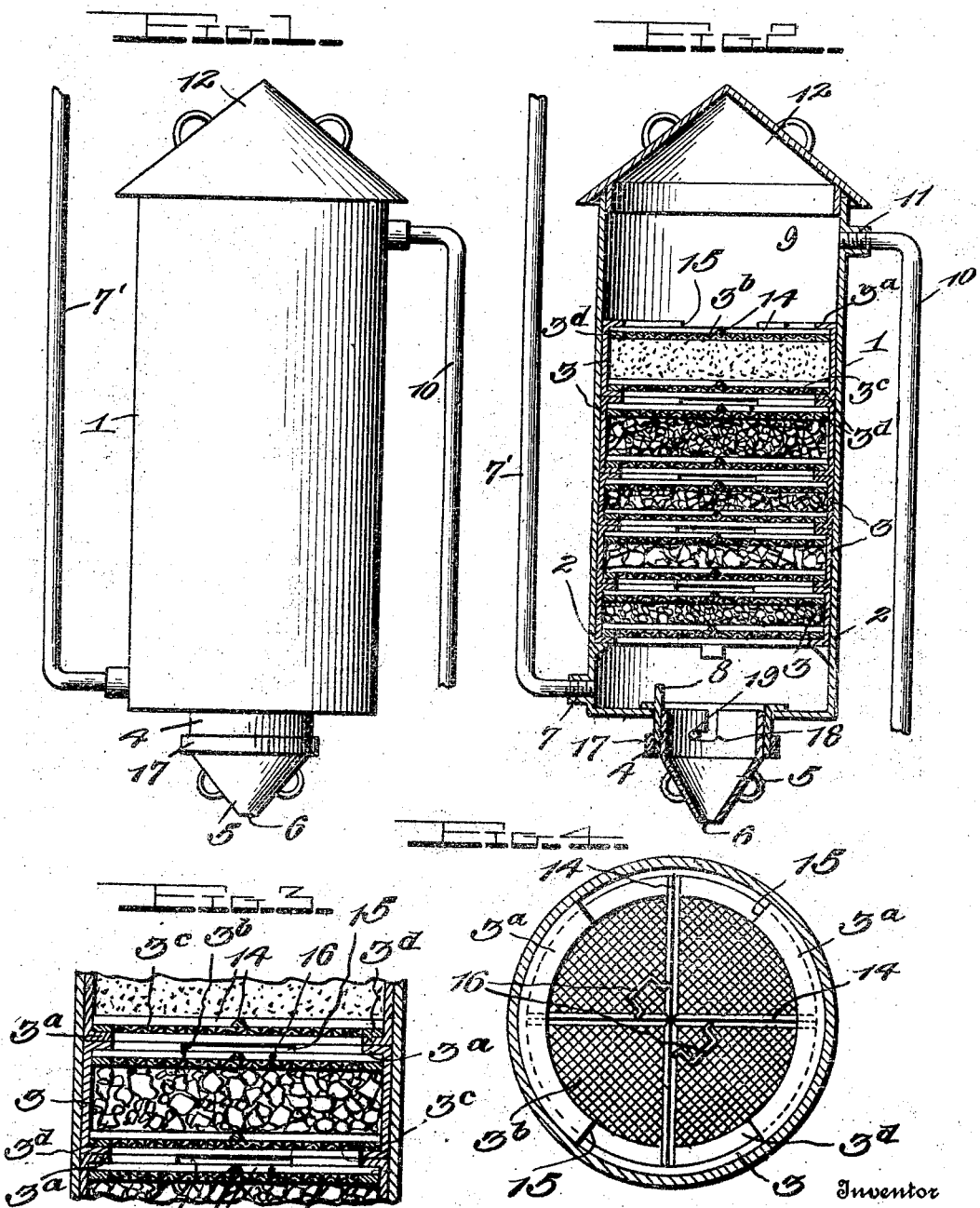

IRA N. PICKETT, OF ODELL, NEBRASKA.

RAIN-WATER FILTER.

1,032,700.　　　Specification of Letters Patent.　　Patented July 16, 1912.

Application filed February 9, 1912. Serial No. 676,581.

*To all whom it may concern:*

Be it known that I, IRA N. PICKETT, a citizen of the United States, residing at Odell, in the county of Gage and State of Nebraska, have invented certain new and useful Improvements in Rain-Water Filters, of which the following is a specification, reference being had to the accompanying drawings.

This invention comprehends certain new and useful improvements in filters and relates particularly to cistern or rain-water filters, the invention having for its primary object a filter, the parts of which are so constructed and arranged that the sediment which flows into the filter with the first water from the shower, may be directly removed from the filter without passing to or through the filtering medium, whereby all tendency to clog up the filtering screens and the granular or similar material disposed between them, will be avoided.

The invention also has for its object a simple, durable and efficient construction of up-flow filter, whereby the sediment will be, to a large extent, caught by the lower faces of the screens forming part of the filtering devices, whereby such sediment may be easily removed from the filtering casing by a downward flushing of the filter, the filter being practically automatic in the cleansing process.

The invention also has for its object a simple device of this character, the parts of which are so arranged that they may be easily taken apart for the purpose of replenishing the supply of clean gravel, charcoal, or other filtering media, or for the purpose of washing the parts or sterilizing them by dry heat or other well known processes. And the invention also aims to generally improve this class of devices and render them more useful and commercially desirable.

With these and other objects in view as will more fully appear as the description proceeds, the invention consists in certain constructions, arrangements and the combinations of the parts, as I shall herein :er more fully describe and claim.

For a full understanding of the invention, reference is to be had to the following description and accompanying drawing in which, Figure 1 is a side elevation of a filter constructed in accordance with my invention. Fig. 2 is a longitudinal sectional view thereof. Fig. 3 is a fragmentary sectional view on an enlarged scale designed to show the preferred formation of the parts of the filtering boxes or compartments, and, Fig. 4 is a horizontal sectional view through the casing of the apparatus, the section being taken in a plane immediately above one of the filtering compartments.

Corresponding and like parts are referred to in the following description and indicated in the accompanying drawing by like reference characters.

Considerable difficulty has heretofore been experienced in the use of rain-water that has flowed from the roofs of buildings, owing to the fact that the proper filtration of the water has been accompanied by considerable difficulty, and this is particularly so when the water from the roof directly enters the filter, that is, the first water of a shower, owing to the fact that considerable sediment has become deposited in the eaves troughs or gutters and in the pipes leading from the down spouts to the filter. With a knowledge of these conditions, my improved filter is so constructed and arranged that the sediment which passes into the filter with the first water of a shower will be directly vented therefrom. After this first water flows into the filter, the succeeding flow will then cause the water to rise upwardly through the filter, through a system of filtering materials which catch the sediment and prevent it from flowing to the cistern or other reservoir. The filter is so arranged that a compartment is provided in the upper portion thereof so that when the rain ceases, a certain amount of the water will be left in the compartment in the upper portion of the filter, such liquid then returning through the filter and flowing in a downward direction so as to pass backwardly through the filtering materials and flow out through the bottom of the filter casing, whereby the filter will cleanse itself of the impurities.

Referring now to the drawing for the detailed disclosure of one embodiment of my invention, the numeral 1 designates a casing which is preferably of non-oxidizable material or some substance or material which is coated with a suitable non-oxidizable surface. The casing may be of any desired shape and size and is preferably of cylindrical form, being provided on its interior wall, and near but spaced from the bottom thereof, with any desired number of lugs 2 which are arranged to detachably support within the casing, any desired number of filtering boxes arranged in superposed relation to each other, and of a detailed construction which I shall hereinafter fully set forth.

The bottom of the casing 1 is formed with an opening, the wall of which is defined by a sediment chamber collar 4 projecting downwardly from said opening and designed for detachable engagement by a thimble 5 of inverted cone-shape, as clearly illustrated in Figs. 1 and 2, said thimble being formed with a preferably permanently open vent orifice 6. The side wall of the casing 1 is formed, preferably near or at the bottom thereof, with a receiving opening 7 in which one end of a rain-water supply pipe 7' is secured, the upper end of said pipe being secured in any desired way to a down spout or eaves trough, these parts being omitted from the drawing in the present instance, as they of themselves form no part of my invention. Within the bottom of the casing 1 and disposed between the inlet opening 7 and the bottom opening of the casing, is a barrier 8 which is designed to intercept the sediment that flows in with the first stream of water of a shower, so that such sediment will be caused to flow out through the bottom opening of the casing and the vent orifice 6.

Each of the filtering compartments designed to hold the filtering medium through which the water is designed to percolate in an upward direction, is formed in the present instance of a box which includes a cylindrical body portion 3 formed at top and bottom with an inwardly extending annular flange 3ª, and also includes a top screen 3ᵇ and a bottom screen 3ᶜ formed of woven wire of any desired or suitable mesh. Each screen includes a marginal ring 3ᵈ, said rings being preferably of a width co-extensive with the width of the flanges of the body portion 3, the lower screen 3ᶜ being designed to be directly supported by the lower annular flange of the body portion 3, while the upper screen is inserted underneath the uppermost flange of the body portion and rests upon and holds properly in place the interposed filtering material, such as sand, gravel, or the like. Preferably, each screen is reinforced by intersecting cross braces 14, and the upper screen of each filtering box or compartment is provided with handles 16 secured to its crossed braces, whereby the upper screen of each box or compartment may be easily removed or applied. In the preferred construction of the parts, the upper annular flange 3ª of each body portion 3 is formed with two diametrically opposed segmental slots, designated 15, whereby the upper screen may be easily placed in position or removed therefrom, when required.

While it is to be understood that my invention is not limited to any particular number of the filtering boxes or compartments, or to any size thereof, or to any kind of filtering material, I have indicated in the present instance, that the lowermost box or compartment, is intended to hold coarse gravel; the next compartment above is intended to hold charcoal; the next compartment above is intended to hold gravel somewhat finer than that in the lowermost box; the next compartment above is intended to hold charcoal, and the uppermost compartment is intended to hold fine gravel or coarse sand.

From as much of the description as has preceded in connection with the accompanying drawing, it will be understood that the various boxes, before being placed in the casing 1, may be easily filled with the desired filtering substance or material, the lower screens 3ᶜ being first placed in position, the gravel, charcoal, sand, or the like being then placed upon the screen 3ᶜ and the box approximately filled, and the upper screen 3ᵇ being then slipped in place by insertion through the segmental openings that are formed in the upper flange 3ª. The first box in the series, after the boxes have all been filled, is placed within the casing, resting upon the lugs 2, and the other boxes are then placed one on top of the other, the parts being so proportioned that a chamber 9 will be formed between the uppermost box of the series and the preferably removable top 12 of the casing. The outflow pipe 10 has its receiving end secured in an opening 11 formed in the side of the casing, preferably near the top of the compartment or chamber 9, as best illustrated in Fig. 2.

The thimble 5 which is inserted in the downwardly projecting reinforcing collar 4 of the casing 1 is preferably secured to said collar in a detachable manner, whereby it may be easily removed and the parts readily cleansed, the means for this detachable connection in the present instance consisting of pins or rivets 19 projecting inwardly from the collar 4 and designed to enter inverted L-shaped slots 18 formed in the thimble 5. If desired, a reinforcing band 17 may be secured to the outer side of the collar 4 at the lower edge thereof to assist in reinforcing the parts as against the hydraulic pressure.

In the practical use of my improved filter, the first water flowing into the casing 1 at the beginning of a shower, will, as is manifest, have with it considerable sediment. This will be directed by the barrier 8 down into the inverted cone-shaped thimble 5, the barrier deflecting the heavier particles into the cone and such particles or sediment being at once removed through the permanent vent orifice 6. When the inflow exceeds the output, the water will rise in a corresponding ratio until it will percolate up through the various filtering boxes or compartments and will reach the filtrate chamber 9, from whence, the water will pass by means of the pipe 10, to the cistern or other reservoir or receptacle. When the inflow ceases, the water in the chamber 9, and held within the various filtering boxes, will naturally flow down through said boxes and flow off through the vent orifice 6, bringing with it whatever sediment may have been held by the up current against the under surface of the filtering material, whereby the entire process of cleaning the filter will be practically an automatic one. Obviously, should it at any time become necessary to replenish the filtering material or to cleanse the same or the other parts of the apparatus, this may be easily accomplished by first removing the top or cap 12 of the casing and taking out the filtering boxes or compartments, one after the other, the upper screens 3ᵇ being easily removed by manipulating the handles 16 and the filtering material being thereby exposed. As the parts of the boxes or compartments are all detachable from each other, it is evident that the operation of cleaning the filtering material by washing it or by dry sterilization, may be accomplished with facility.

While the accompanying drawing illustrates what I believe to be the preferred embodiment of my invention, it is to be understood that the invention is not limited thereby, but that various changes may be made in the construction, arrangement and proportions of the parts without departing from the scope of the invention, as defined in the appended claim.

What I claim is:—

A filter of the character described, including a casing provided with a bottom opening and a depending collar defining the wall of said opening and projecting downwardly therefrom, an inverted cone-shaped thimble having a detachable connection with said collar and formed with a vent orifice, the bottom of the casing being formed with a barrier and with an opening, the barrier being interposed between said openings, filtering material held in said casing and spaced at the bottom thereof above the barrier and the said openings; the casing being formed at its top with an outlet opening above and in spaced relation to the top of the filtering material, and a detachable cap for the upper end of the casing.

In testimony whereof I hereunto affix my signature in the presence of two witnesses.

IRA N. PICKETT.

Witnesses:
J. E. MURPHY,
H. M. GLASGOW.

---

Copies of this patent may be obtained for five cents each, by addressing the "Commissioner of Patents, Washington, D. C."